UNITED STATES PATENT OFFICE.

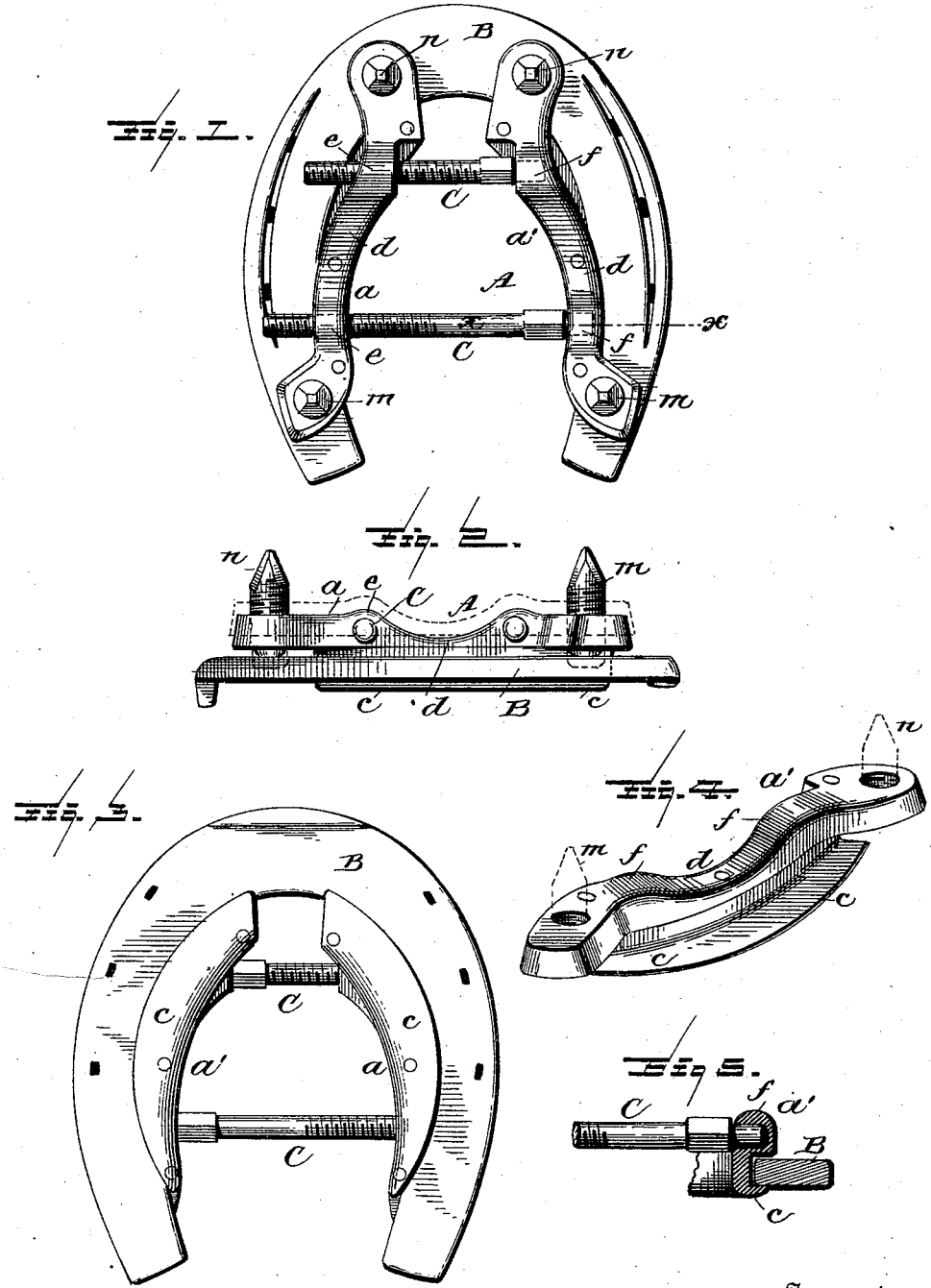

THADDEUS DE LYONS, OF WASHINGTON, DISTRICT OF COLUMBIA.

REMOVABLE ATTACHMENT FOR HORSESHOES.

SPECIFICATION forming part of Letters Patent No. 457,260, dated August 4, 1891.

Application filed April 28, 1890. Serial No. 349,733. (No model.)

*To all whom it may concern:*

Be it known that I, THADDEUS DE LYONS, a citizen of the United States, residing at Washington, in the District of Columbia, have invented certain new and useful Improvements in Removable Attachments for Horseshoes; and I do hereby declare the following to be a full, clear, and exact description of the invention, such as will enable others skilled in the art to which it appertains to make and use the same.

This invention relates to certain new and useful improvements in removable attachments for horseshoes; and it consists substantially in such features of arrangement, construction, and combinations of parts as will hereinafter be more particularly described.

The invention has for its main object to provide a removable attachment for horseshoes which shall prevent slipping of the horse while traveling over smooth or slippery surfaces.

This invention has for its further object to so construct an attachment of the character referred to that there shall be no liability of the frog of the horse's hoof pressing against the adjusting-screws when the attachment is applied.

The invention has for a further object to so construct an attachment of the kind referred to that the parts comprising said attachment may be readily adjusted with relation to the shoe, so as to always be maintained in a close fit and all rattling or looseness overcome.

Further, the invention has for its object to provide an attachment of the kind referred to which shall be capable of adjustment to fit any size of horseshoe, and at the same time be less liable to displacement than with many former inventions of a like nature.

Finally, the invention has for its object to so construct and arrange the adjusting devices between the two parts comprising the attachment as that there is less liability to distortion of either the parts of the attachment or the adjusting devices themselves, all as will more fully hereinafter appear when taken in connection with the accompanying drawings, wherein—

Figure 1 represents a bottom plan view of my improved attachment as when fitted to an ordinary horseshoe. Fig. 2 is a side elevation representing in dotted lines the manner in which the toe-calks of the attachment are adjusted so as to take up for wear and always maintain the attachment in close-fitting relationship to the shoe. Fig. 3 is a top or plan view of my improved attachment as it appears on viewing the horseshoe from its upper surface. Fig. 4 is a view in perspective of one of the two parts comprising the attachment, so as to more clearly illustrate the construction thereof. Fig. 5 is a transverse section on line $x$ $x$, Fig. 1.

In carrying my invention into effect I form the attachment of two separate and distinct counterpart portions, such as is represented in Fig. 4, said portions being so shaped, curved, or twisted as to conform to the general outline of the inner edges of the horseshoe and also being formed or provided with wings or flaps turned over to embrace said inner edges and be thereby held from dropping off the shoe while in use, said wings or flaps being of course designed to fit between the horse's hoof and the shoe with such compactness as to offer no inconvenience to the animal or cause any pulling of the shoe away from the hoof. The said portions of the attachment are provided with heel and toe calks free from shoulders or abutments, which are adjustable by screw-threads formed thereon, so as to enable either or both ends of the parts of the attachment to be tightened against the shoe, and thereby maintained in close-fitting relationship therewith.

I further provide for the lateral or transverse adjustments of the two parts of my attachment, so as to adapt the same to shoes of any size, and, in contradistinction to many former inventions on this subject, where but a single transverse adjusting screw or bolt is employed, I use two screws, which not only enable more varied adjustments of the device, but also are themselves less liable to bending or distortion due to the striking of the hoof on the ground sidewise or unevenly. In this connection I desire to state that with former inventions but a single transverse screw has been arranged at or somewhere near the center of the attachments. In such cases, owing to the screw being in the center, or nearly so, the attachment is rendered more or less weak and easily sprung inward at the heel and toe, thereby bending or twisting the screw; and since the screw, to work at all, must be kept perfectly straight at all times, the user of such an attachment having the adjusting-screw in about the center has experienced a great deal of inconvenience and trouble on account of the twisting or distortion of the adjusting-screw to such an extent as to render it incapable of being turned, and which in many instances has necessitated the insertion of new screws with the loss of much time and labor. The cause of the bending or twisting of the screw, is from uneven contact of either the toe or heel calks with the ground-surface.

I obviate the difficulty above noted by employing two adjusting-screws, which are arranged on opposite sides of the approximate center of the shoe, one nearer the toe-calks and the other nearest the heel-calks of the attachment, by which arrangement there is a more equal resistance to strain from whatever direction brought to bear or encountered, and, besides, more delicate and better-fitting adjustments can be had than could be had from a single centrally-arranged screw or bolt.

In all cases where the foot of the animal is in healthy condition the frog usually touches the ground, and if the adjusting-screws are not placed some distance away from the frog it will, from constant pressure upon the screws, become sore, and consequently lame the horse. To remedy this defect and to permit free access to the screws when securing the attachment to the shoe, I place the said screws at or below the level of the outer face of the horse's shoe. In this way the frog has ample room, and the attachment can be easily and quickly applied and removed without any inconvenience and worn by the horse without any danger of lameness therefrom.

Reference being had to the several parts of the drawings by the letters marked thereon, A represents my improved attachment as an entirety, and which, it will be observed, is formed of the two counterpart portions $a\ a'$, each being curved, bent, or shaped to conform to the general outlines of the inner edges of the horseshoe B, and each also being formed with a wing $c$ to overlap such inner edges and be thereby held in place. The said portions $a\ a'$ are furthermore recessed or cut out between their extremities, (see $d$, Fig. 4,) so as to render them as light as is consistent for their intended purpose and also to effect a saving in quantity of metal employed in their construction. At suitable points on either side of their centers the said parts $a\ a'$ are somewhat enlarged, as shown at $e\ e$ and $f\ f$, the one part $a$ being formed with screw-threaded openings for the passage and working of the adjustable screw-bolts C C, while the other part $a'$ is formed correspondingly with recesses in which the ends of said bolts are received and work. (See Fig. 5.) It will be seen that owing to the difference in the width of the shoe the bolt nearest the heel-calks is necessarily made longer than the other bolt.

In order to enable the attachment to be adjusted to the shoe to take up wear and looseness, I form the toe-calks $n\ n$ and heel-calks $m\ m$ free from shoulders and abutments throughout, and at the same time I provide their ends slightly pointed or conical, so as to take hold upon the surface traveled over by the animal. To render said calks adjustable, they are made screw-threaded, as shown, and work in screw-threaded openings provided therefor at or near the ends of parts $a\ a'$, in which they work.

An attachment made in accordance with my invention possesses all the advantages and characteristics of those heretofore known. The adjusting-screws are rendered safe from bending or twisting. The attachment will fit any size shoe. The calks, being the same size from top to bottom and free from shoulders or stops, can be adjusted to take up wear of the shoe consequent upon usage, and thereby maintain at all times a close snug hold upon the shoe, rendering looseness and rattling impossible.

Having thus described my invention, what I claim as new, and desire to secure by Letters Patent, is—

A removable attachment for horseshoes, consisting of two separate sections $a\ a'$, formed to fit the inner edges of a horseshoe, adjustable heel and toe calks adapted to pass through said sections and engage the outer face of the shoe to prevent the attachment becoming loose upon the same, and adjusting-screws working in said sections on opposite sides of their centers of length to clamp the attachment in place when expanded and release it when contracted, substantially as set forth.

In testimony whereof I have hereunto set my hand this 16th day of April, 1890.

THADDEUS DE LYONS.

Witnesses:
C. H. FICKLING,
J. FICKLING.